3,236,741
NITROGEN FIXING COMPOSITION AND ITS PREPARATION FROM CLOSTRIDIUM

James E. Carnahan, Wellesley Hills, Mass., and Leonard E. Mortenson, Lafayette, Ind., assignors to E. I. du Pont de Nemours and Company, Wilmington, Del., a corporation of Delaware
No Drawing. Filed May 25, 1964, Ser. No. 370,034
5 Claims. (Cl. 195—50)

This application is a continuation-in-part of application Serial No. 55,170, filed September 12, 1960, and now abandoned.

This invention relates to a cell-free, catalytic composition capable of absorbing and activating nitrogen at atmospheric temperatures and pressures.

Nitrogen fixation is a highly important commercial operation. Because of the low chemical reactivity of nitrogen, this process requires a combination of high temperature, high pressure, and catalysts. On the other hand, several classes of microorganisms have the remarkable power of converting elemental nitrogen to nitrogenous products under atmospheric temperature and pressure.

Because of the tremendous importance of bacterial nitrogen fixation to agriculture and because of the belief that an understanding of this process would provide the key to an improved commercial nitrogen fixation process, much research has been carried out on the mechanism by which bacteria carry out this process in nature. Considerable effort has been aimed at isolation, for study, of the nitrogen-fixing enzyme system from aerobic and anaerobic free-living soil bacteria, blue-green algae, and legume root nodules. However, prior attempts to isolate the nitrogen-fixing enzyme in an active form have been unsuccessful. There have been reports of the isolation of cell-free preparations capable of fixing nitrogen, but the amount of nitrogen fixed by such products was hardly detectable and not reproducible; the majority of preparations by any heretofore described method being inactive.

It has now been found that a cell-free, reproducibly active, nitrogen-fixing catalyst composition can be prepared from nitrogen-fixing bacteria by the process described below. This novel catalytic material is a cell-free, water-soluble nitrogenous composition which has the property, when in aqueous solution, of causing conversion of elemental nitrogen (at atmospheric pressure and room temperature) to ammonia when supplied with a system comprising an energy source and a reductant, this conversion corresponding in amount to at least 0.5% of the amount of protein-nitrogen initially present in the catalytic nitrogenous composition, or of at least 0.07% based on the weight of dry cell-free composition.

The nitrogen-fixing catalytic composition of this invention can be prepared by crushing in a Hughes press a frozen (−15 to −35° C.) concentrated suspension of cells of the nitrogen-fixing bacterium, *Clostridium pasteurianum*, in a potassium phosphate buffer at a pH of 6.3–7.0, preferably at 6.8, and centrifuging the crushed mass to remove the broken cells to give a cell-free preparation. This process is best carried out in an inert atmosphere, e.g., helium.

In another method, dried cells of *C. pasteurianum* are autolyzed by shaking them anaerobically in the buffer solution at ordinary temperatures, e.g., 30° C., and then centrifuging the mass at 0° C. to remove the cell debris.

The catalytic compositions prepared by the above methods are free from intact cells as evidenced by microscopic examination and ultracentrifugation. The compositions must be protected from air during preparation and storage since they are rapidly inactivated by oxygen.

The foregoing cell-free compositions actively fix nitrogen at normal temperature and pressure when supplied with a system comprising an energy source and a reductant. The system apparently acts as an adenosine triphosphate (ATP) generator and as a reductant. Alkali metal pyruvates and α-ketobutyrates, especially the sodium salts thereof, each have been found to act in a dual role, i.e., as both the energy source and the reductant.

Other operable systems include (1) alkali metal acetyl phosphate, especially dilithium acetyl phosphate, which acts as the ATP generator and potassium borohydride, which acts as the reductant, and (2) a mixture of creatine phosphate, creatine kinase and potassium borohydride. In these two energy systems, hydrogen or enzymatically reduced diphosphopyridine nucleotide can be used as the reductant in place of the potassium borohydride.

In general, small portions of the energy system are added to the cell-free compositions and the mixture shaken in the presence of nitrogen at about atmospheric pressure. After about one hour's exposure, the compositions show a nitrogen enrichment ranging from 0.1 to 0.8 atom percent. After one hour's exposure, the compositions are still capable of fixing more nitrogen.

The nitrogen enrichment can be conveniently shown by using stable isotopic nitrogen, i.e., $^{15}N_2$.

The fixation reaction apparently involves ammonia synthesis since the $^{15}N_2$ taken up by the cell-free extracts can be recovered quantitatively as $^{15}NH_3$. Tests with ordinary nitrogen, $^{14}N_2$, show that in the presence of sodium pyruvate the extracts cause conversion of nitrogen to ammonia to the extent of at least 0.5% of the amount of nitrogen present in the initial extract, calculated as protein-nitrogen.

The catalytic component, or "nitrogenase," in the above extracts is water-soluble since activity is not sedimented by centrifugation at 144,000 times gravity for three hours. The centrifuged extracts are clear brown solutions that fixed up to 25μg. of nitrogen per milligram of combined nitrogen or protein nitrogen initially present.

The catalytic composition shows a spectral response to nitrogen. The difference spectrum under nitrogen versus hydrogen or argon shows absorption in the 290–300 mμ region.

The preparation and characterization of the catalytic composition of this invention are described more fully below.

GROWTH OF CELLS

Cultures of *Clostridium pasteurianum* (Wisconsin-5, see American Type Culture Collection 6013) were grown in a medium prepared as indicated by the following table:

500 ml. distilled water
10 g. sucrose
0.05 g. $MgSO_4 \cdot H_2O$
0.05 g. NaCl
0.005 g. $Na_2MoO_4 \cdot 2H_2O$
0.25 g. $KH_2PO_4$
0.25 g. $K_2HPO_4$
5.0 g. $CaCO_3$
0.5 μg. biotin
0.5 μg. p-aminobenzoic acid
1.0 ml. of solution of 5 g. $FeCl_3 \cdot 6H_2O$ in 100 ml. of abs. ethanol The culture medium above was maintained at 30° C. after inoculation with the cells. Nitrogen was bubbled under the liquid surface to provide both agitation and source of nitrogen.

Culture growth was conveniently carried out in volumes of the medium between 0.5 l. and 40 l. employing a 2% inoculum in each case. After 16 hours' growth, optical density measured at 650 mμ in a colorimeter was 0.7–0.8. The pH of the culture (cell mixture) was between 5.4 and 5.8.

The above culture medium preparations were carried out in 500 ml. of distilled water. When 250-gallon containers are used, the above-listed medium ingredients can be used in the same proportions, or, preferably the phosphate content can be reduced to 0.53 mM. and a pH-stat used in place of the $CaCO_3$.

CELL ISOLATION

Cells were concentrated after growth in the above medium by sedimentation in a centrifuge. In general, cells were washed by suspension in a small volume of buffer and centrifuged at a temperature of 5–10° C. with a force of 27,000×g. The buffer employed throughout this work was prepared by dissolving 6.8 g. of $KH_2PO_4$ in 400 ml. of distilled water, adjusted to pH of 6.8 with KOH, and diluted to 1 l.

REMOVAL OF NITROGEN-FIXING MATERIAL FROM CELL

A. *Rupture by Hughes press*

Cells from 400–1200 ml. of culture, as concentrated above by means of a centrifuge, were resuspended in 9 ml. of buffer solution. This suspension (preferably having a pH of below 7.0 and generally 6.3–6.8) was placed in a Hughes press (see Hughes, British J. Exptl. Pathol. 32, 97 (1951)), which had been cooled to −35° C. After five minutes, the frozen cell suspension was driven through the press by means of hydraulic pressure or alternatively by 20–25 blows with a 4.5 kg. weight dropped seven feet through a pipe guide. The press was opened in air and the frozen preparation removed, thawed under nitrogen, and centrifuged to remove debris and intact cells. Centrifugation was at 27,000×g at 0° C. for 15 minutes under an atmosphere of nitrogen.

B. *Rupture by autolysis of dried cells*

Ten liters of a culture was harvested in a continuous centrifuge with nitrogen pressure used to force the liquid from the culture vessel into the centrifuge bowl. The cell paste was washed with 500 ml. of buffer and recentrifuged. Distilled water (generally between 5–20 ml.) at 5° C. was added to thin the cell paste to produce a suspension of cells that could be poured into a 5 l.-flask. The cells were dried by rotating the flask one-half hour under reduced pressure (0.25–0.5 mm.) in a water bath at 30–40° C. The flask was left under vacuum overnight without rotation to remove the last traces of water. The dried cells were stored under air or nitrogen at −15° C. in a sealed bottle. The yield of washed and dried cells averaged 6.3–7.5 g. from 10 l. of the original culture. The dried cells retained their capacity to yield nitrogen-fixing extracts for periods of a month or more during storage at −15° C., provided moisture was excluded.

Ten grams of dried cells were pulverized without exclusion of air by mortar and pestle and added to 100 ml. of buffer in a 250 ml. flask. Since air was found to be deleterious when present after the autolysis, the vessel was purged with hydrogen. It was sealed with 0.8 atm. of hydrogen and placed on a rotary shaker at 30° C. for 45 minutes. The flask was cooled to 0° C. in an ice bath and the contents poured into 50 ml. centrifuging cups and centrifuged at 27,000×g for 15 minutes at 0° C. The resulting supernatant solution was cell-free and active for fixing nitrogen.

Even more rigorous centrifugation, e.g., at 144,000×g for 3–4 hours at 0° C., did not remove nitrogen-fixing activity from the supernatant cell extract. Examination under a microscope also proved that the liquid contained no cells.

The extracts were stable to storage for periods of up to several days when retained under an inert atmosphere (nitrogen or hydrogen) and at low temperatures below 5° C. Freezing was beneficial to activity during storage for prolonged periods.

PROPERTIES OF CELL-FREE EXTRACT

A. *Nitrogen fixation*

The following experimental procedures were employed to show the nitrogen-fixing characteristic of the cell-free, water-soluble, proteinaceous material.

(1) SODIUM PYRUVATE

In this technique, the proportions of extract, buffer, and sodium pyruvate were chosen so that the solution contained 40–90 mg. of protein and 100–200 mg. of sodium pyruvate in a total volume of 5–8 ml. Sodium pyruvate (100 mg.) and buffer (to maintain pH at 6.5) were placed in a 50-ml. round-bottomed flask and frozen. The extract (in an amount to give 40–90 mg. of protein) as obtained by either of the above procedures was added, and the flask was alternately evacuated and filled with nitrogen through at least five cycles while thawing was completed and entrapped air removed. Finally, the flask was filled with 0.5 atm. of nitrogen containing 60% as the isotope of atomic weight 15, i.e., $^{15}N_2$. The flask was sealed and agitated for 40–60 minutes at 30° C. in a shaker. During the reaction, carbon dioxide and hydrogen accumulated in the flask. The solution was then digested by the Kjeldahl procedure and the resulting ammonia converted to nitrogen gas for determination of the $^{15}N/^{14}N$ ratio in a mass spectrometer. The amount of nitrogen fixed by the above procedure varied between 0.2 and 0.5 mg.

The nitrogen was fixed primarily as ammonia since 95% or more of the $^{15}N_2$ fixed was recovered as this ammonium isotope by rapid distillation from dilute alkali.

(2) DILITHIUM ACETYL PHOSPHATE AND POTASSIUM BOROHYDRIDE

A 50 ml. incubation flask having a side arm was cooled to 5° C. and 4 ml. of cell-free extract of *C. pasteurianum* containing 44 mg. of protein, along with 100 μmoles of potassium phosphate buffer of pH 6.5, added.

The incubation flask was evacuated and covered with 0.8 to 1.0 atm. of nitrogen and then sealed. A mixture of 20–120 μmoles of $KBH_4$ and 200 μmoles (0.05 M) of dilithium acetyl phosphate in a dry state were introduced through the side arm.

After about 30–60 minutes of agitation at 30° C., the ammonia content of the solution was determined by titration after diffusion separation by the micro-Conway method.

By replacing the nitrogen with argon and running the experiment again, the amount of nitrogen converted to ammonia as a result of nitrogen fixation could be determined by subtracting the amount produced using the argon cover from that produced using the nitrogen cover. The difference was found to be from 2–10 μmoles of $NH_3$ and is from 50–100 percent of that obtained with pyruvate. A typical amount of ammonia synthesis is 7.9 mμmoles/mg. protein/min.

Alternatively, when a nitrogen cover containing 8% $^{15}N_2$ was used, solutions were produced that showed an atom percent excess of $^{15}N_2$ of approximately 0.06 to 0.09 after incubation, Kjeldahl digestion and mass spectrometric analysis.

(3) DISODIUM CREATINE PHOSPHATE, CREATINE KINASE AND $KBH_4$

When the immediately above procedure was followed, except that a mixture of disodium creatine phosphate and creatine kinase replaced the dilithium acetyl phosphate, and 1 mg. of creatine kinase was added to the initial flask mixture, nitrogen was fixed in amounts of 2–10 μmoles.

(4) DILITHIUM ACETYL PHOSPHATE AND HYDROGEN

When Procedure 2 was followed, except that hydrogen was used in place of the $KBH_4$ (only the dilithium acetyl phosphate being added through the side arm, since the hydrogen was added in a 50:50 $N_2:H_2$ ratio in the covering atmosphere), nitrogen was fixed in amounts of at least about 3.8 m$\mu$moles $NH_3$/mg. protein/min.

(5) DILITHIUM ACETYL PHOSPHATE AND NADH

When Procedure 2 was followed, except that enzymatically reduced diphosphopyridine nucleotide (DPN) was used in place of $KBH_4$ in amounts of 10–40 $\mu$moles, nitrogen was fixed in amounts of 2–10 $\mu$moles (at least 2.0 m$\mu$moles/mg. protein/min.).

It was found in all the foregoing procedures that the pre-addition of $KBH_4$ (0.1 mg.) to the reaction flask resulted in increased $N_2$ fixation.

It was also found that when creatine phosphate (0.05 M) and creatine kinase (1 mg.) were added to the pyruvate in Procedure 1, the ammonia synthesis increased by about 50 percent.

B. Spectral characteristics

A method of characterization of the active nitrogen-fixing proteinaceous material of this invention is by the difference in light absorption spectra when the material is placed in contact with various compounds.

For example, the cell-free extracts of this invention exhibit a marked increase in light absorption in contact with elemental nitrogen under one atmosphere pressure, as compared with contact with hydrogen or argon under the same pressure, the increase being greatest for light of wave lengths in the region 290–300 m$\mu$ (or 2900–3000 A.), the increase exceeding 0.1 optical density unit in aqueous solutions containing said nitrogenous composition in amount corresponding to a nitrogen content of 2 mg., calculated as protein-nitrogen, per ml.

In addition, the cell-free compositions of this invention show increased spectral absorption within the range 335–400 m$\mu$ in the presence of elemental nitrogen and an alkali metal pyruvate.

The spectral changes that occur when proteinaceous material is contacted with nitrogen indicate that a coordination compound exists, i.e., there is an absorption compound of $N_2$ with the organic nitrogenous composition in aqueous solution. The coordination probably involves the presence of a metal of atomic number of at least 25, including specifically iron and molybdenum in the protein.

In a typical determination, 3.5 ml. of buffer containing 160 mg. of sodium pyruvate was placed in separate 25-ml. flasks and degassed by stirring under vacuum at room temperature for five minutes. The flasks were then filled with hydrogen and cooled to 5° C. One-half ml. of nitrogen-fixing extract as obtained above containing generally 4–6 mg. protein nitrogen per ml. and which had previously been centrifuged at 100,000×g for 15 minutes was added to the flasks. The flasks were then evacuated, flushed, and filled with hydrogen through six cycles. The flasks and contents were agitated and warmed to 25° C. for 15 minutes and then cooled to 5° C. The flasks were then flushed and filled with the selected gas. The flasks were again agitated at 5° C. for 15 minutes and then inverted in an ice bath and the contents transferred to spectrometer cells by application of 3–5 mm. pressure through a capillary. The difference spectra under nitrogen relative to a sample under hydrogen was then obtained by using the hydrogen sample as a blank in a commercial spectrometer. The difference spectra showed strong absorption between about 335–400 m$\mu$ with a peak at 365.

When the above was repeated, except nitrogen was replaced by oxygen or by argon, the difference spectra showed a transmission maximum rather than absorption at 365 m$\mu$.

In the absence of pyruvate, the different absorptivities of light by preparations under nitrogen versus hydrogen atmospheres showed a peak at about 295–300 m$\mu$.

Furthermore, in the absence of pyruvate, the difference spectra of oxygen versus hydrogen atmospheres showed absorption maximum at about 300 m$\mu$ and in the range of 400–500 (with a peak at about 440) and a transmission maximum at about 355.

C. Analysis

In general, a dry catalytic composition of this invention contains 46–48% carbon, 6.5–8.0% hydrogen, 13–16% nitrogen, and 0.5–1.5% sulfur. Specifically, a sample of the purified catalytic composition of this invention had the following analysis: C, 47.38%; H, 7.37%; N, 13.65%, 13.80%; S, 0.97%. Metal analysis by emission spectrography indicated that of the metals K was present in an amount corresponding to about 75%, Na up to about 5%, Fe up to about 0.5% while in lesser amounts the following occurred (with range in p.p.m. indicated parenthetically): Mg (500–2500), Ca (300–1500), Si (75–350), Al (75–350), Mn (25–150), Mo (25–150), Ti (10–50), Cu (10–50), Ba (10–50), and trace of Ni.

In addition to the above, it has been found that the cell-free extracts of this invention contain adenosine diphosphate, electron carriers, nitrogenase, coenzyme A, and enzymes which produce hydrogenase activity, acetate kinase activity, phosphotransacetylase activity and pyruvic dehydrogenase activity.

Adenosine diphosphate and magnesium ions have been found to be present in the cell-free extracts of this invention and necessary to the nitrogen-fixing property since dialysis of the extracts in a 0.05 M phosphate buffer of pH 6.5 for 2 hours at room temperature under 0.8 atm. of $H_2$ resulted in loss of the nitrogen-fixing properties. This property was restored by the addition of adenosine diphosphate and magnesium ions to the dialyzed extract.

On treatment of an extract of this invention with DEAE-cellulose (diethylaminoethyl cellulose), the nitrogen-fixing property was lost, thus indicating that at least one electron carrier was present initially.

Enzymes which produce pyruvic dehydrogenase activity have been found to be present since $H_2$, $CO_2$ and acetyl phosphate are produced when pyruvate is used as the system. These are the products obtained in the phosphoroclastic reaction $$CH_3-CO-COOH + H_3PO_4 \xrightarrow{enzymes} CH_3COOPO_3H + CO_2 + H_2$$

Coenzyme A is required in the phosphoroclastic reaction and thus is also present in the cell-free compositions of this invention. Cell-free compositions of this invention freed from coenzyme A (Co A) by dialysis for 60 hours at 3° under $N_2$ did not catalyze the reduction of electron-accepting dyes until Co A was added.

The cell-free extracts of this invention were analyzed and found to contain phosphotransacetylase, acetate kinase and hydrogenase activity.

As detailed above, the sequence of operations employed to obtain the novel water-soluble, proteinaceous substance useful for converting inert atmospheric nitrogen into useful nitrogenous compounds involves the following:

(1) Growth of cells
(2) Concentration or isolation of cells
(3) Rupture of cell walls
(4) Removal of the active proteinaceous material from cell wall debris and non-active substances The catalytic product thus obtained fixes atmospheric nitrogen when there is additionally present an energy source and a reductant. One compound, such as the pyruvates, or the $\alpha$-ketobutyrates may fulfill both requirements. In the growth of the cells by the techniques shown above, it is preferred that the pH of the culture medium be above 5.4. During the growth of the cells, this can be accomplished by addition of calcium carbonate as required. In general, the pH during isolation, storage, or use of the active material should be in the range of 6.3 to 6.8. Lower pH results in lower yields and less active extracts.

Although potassium phosphate buffer is generally preferred, other materials have been satisfactory for use as buffers. These include tris(hydroxymethyl)aminomethane, carodylate, diethyl barbituric acid, maleic acid, citric acid, and succinic acid. These were employed at a pH of about 6.8, which in the case of the acids was obtained by addition of alkali, e.g., sodium or potassium hydroxide or carbonate.

It is preferred that both cell debris and whole cells be completely removed from the nitrogen-fixing, water-soluble product. Materials containing less than 2–5% of the original cells are usually more active than an equivalent amount of the cells used to make the preparation in nitrogen fixation. This increased activity is of the order of seven-fold. The use of the centrifuge at temperatures of 0–30° C. is a particularly convenient method of separation of the aqueous solution from unbroken cells and broken-cell debris. Other methods, such as filtration, can be used but are more difficult. As seen above, the nitrogen-fixing active proteinaceous material requires an additional material which serves as an energy source and a reductant to effect fixation of atmospheric nitrogen.

When concerned solely with the fixing of nitrogen, the pyruvate is preferred as the system, since it can be employed simply. However, when a study of the complex route by which nitrogen is fixed is desired, the system employed is preferably one in which the energy source and the reductant are two different compounds, for in this instance, the portion of the route requiring the phosphorclastic reaction can be eliminated. Nitrogen-fixing activity of the cell-free material is optimum when the pH of the extract is 6.3–6.5, although pH's within the range 6.3–6.8 can be used. When the pH is permitted to drop below about 5.5, the activity of the extract for fixing nitrogen is destroyed. It is also noted that oxygen has a deleterious effect on the activity of solutions containing the extracted proteinaceous material. For example, air or oxygen atmospheres over the enzyme solutions reduce nitrogen-fixing activity up to 10% or more in very short periods of exposure. The nitrogen-fixing activity of the product of this invention has been illustrated in some instances by the use of the heavy isotope of nitrogen, $^{15}N_2$. The extract, however, also acts on the more abundant isotope, $^{14}N_2$, and it is sufficiently active that the amount fixed can be determined by measurement of the over-all increase in nitrogen content by ordinary methods based on ammonia titration. The maximum rate of nitrogen fixation occurs shortly after (generally in the first hour or so) the addition of the energy source-reductant system to the extract under a nitrogen atmosphere.

This invention provides a proteinaceous material capable of converting atmospheric nitrogen through a coordination complex to covalent nitrogen compounds outside cellular organisms. The product is the first that has been obtained capable of such a reproducible reaction. The proteinaceous material contains metals, and the coordination complex involves metallic atoms. The product of this invention, therefore, converts atmospheric nitrogen under ordinary conditions of temperature and pressure to useful nitrogenous compounds.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A process for the preparation of a nitrogen-fixing catalytic composition which comprises mechanically crushing a concentrated suspension of cells of *Clostridium pasteurianum* in the absence of oxygen, in a Hughes press at a pH in the range of 6.3 to 7.0 and at a temperature in the range of −15° to −35° C. and in the continued absence of oxygen, centrifuging the crushed mass, providing a nitrogen-fixing cell-free preparation as the supernatant liquid.

2. Process for the preparation of a nitrogen-fixing catalytic composition which comprises mechanically shaking in the absence of oxygen, anaerobically dried cells of *Clostridium pasteurianum* in a buffer solution at a pH in the range of 6.3 to 6.8, and at about 30° C., until lysis is effected and in the continued absence of oxygen, centrifuging the resultant mass at 0°–30° C., providing a nitrogen-fixing cell-free preparation as the supernatant liquid.

3. A water-soluble, cell-free proteinaceous composition which, in the presence of elemental nitrogen and pyruvic acid salts, exhibits increased spectral absorption between 335–400 m$\mu$ and converts elemental nitrogen into ammonia in an amount corresponding to at least 0.5% of protein nitrogen in the cell-free composition, said composition being further characterized by exhibiting increased spectral absorption at about 290–300 m$\mu$ in the presence of elemental nitrogen and in the absence of pyruvic acid salts, said composition being further characterized as containing 46–48% carbon, 6.5–8.0% hydrogen, 13–16% nitrogen, 0.5–1.5% sulfur, and metals of which about 75% is potassium, 5% is sodium, 0.5% is iron, 500–2500 p.p.m. is magnesium, 300–1500 p.p.m. is calcium, 75–350 p.p.m. is silicon, 75–350 p.p.m. is aluminum, 25–150 p.p.m. manganese, 25–150 p.p.m. is molybdenum, 10–50 p.p.m. is titanium, 10–50 p.p.m. is copper, 10–50 p.p.m. is barium and nickel in a trace amount; said composition being further characterized as containing adenosine diphosphate, electron carriers, nitrogenase, coenzyme A and enzymes which produce hydrogenase activity, acetate kinase activity, phosphotransacetylase activity and pyruvic dehydrogenase activity; said composition prepared by a process selected from the processes consisting of (a) mechanically crushing a concentrated suspension of cells of *Clostridium pasteurianum* in the absence of oxygen, in a Hughes press at a pH in the range of 6.3 to 7.0 at a temperature in the range of −15° to −35° C. and centrifuging the crushed mass in the continued absence of oxygen to obtain said composition as the supernatant liquid, and (b) mechanically shaking anaerobically dried cells of *Clostridium pasteurianum* in a buffer solution at a pH in the range of 6.3 to 6.8 at about 30° C., in the absence of oxygen, until lysis is effected, and centrifuging the resultant mass at 0°–30° C. in the continued absence of oxygen to obtain said composition as the supernatant liquid.

4. A water-soluble, cell-free proteinaceous composition which, in the presence of elemental nitrogen and pyruvic acid salts, exhibits increased spectral absorption between 335–400 m$\mu$ and converts elemental nitrogen into ammonia in an amount corresponding to at least 0.5% of protein nitrogen in the cell-free composition, said composition being further characterized by exhibiting increased spectral absorption at about 290–300 m$\mu$ in the presence of elemental nitrogen and in the absence of pyruvic acid salts, said composition being further characterized as containing 46–48% carbon, 6.5–8.0% hydrogen, 13–16% nitrogen, 0.5–1.5% sulfur, and metals of which about 75% is potassium, 5% is sodium, 0.5% is iron, 500–2500 p.p.m. is magnesium, 300–1500 p.p.m. is calcium, 75–350 p.p.m. is silicon, 75–350 p.p.m. is aluminum, 25–150 p.p.m. manganese, 25–150 p.p.m. is molybdenum, 10–50 p.p.m. is titanium, 10–50 p.p.m. is copper, 10–50 p.p.m. is barium and nickel in a trace amount; said composition being further characterized as containing adenosine diphosphate, electron carriers, nitrogenase, coenzyme A and enzymes which produce hydrogenase activity, acetate kinase activity, phosphotransacetylase activity and pyruvic dehydrogenase activity; said composition prepared by mechanically crushing a concentrated suspension of cells of *Clostridium pasteurianum* in the absence of oxygen, in a Hughes press at a pH in the range of 6.3 to 7.0 at a temperature in the range of −15° to −35° C. and centrifuging the crushed mass in the continued absence of oxygen to obtain said composition as the supernatant liquid.

5. A water-soluble, cell-free proteinaceous composition which, in the presence of elemental nitrogen and pyruvic acid salts, exhibits increased spectral absorption between 335–400 m$\mu$ and converts elemental nitrogen into ammonia in an amount corresponding to at least 0.5% of protein nitrogen in the cell-free composition, said composition being further characterized by exhibiting increased spectral absorption at about 290–300 m$\mu$ in the presence of elemental nitrogen and in the absence of pyruvic acid salts, said composition being further characterized as containing 46–48% carbon, 6.5–8.0% hydrogen, 13–16% nitrogen, 0.5–1.5% sulfur, and metals of which about 75% is potassium, 5% is sodium, 0.5% is iron, 500–2500 p.p.m. is magnesium, 300–1500 p.p.m. is calcium, 75–350 p.p.m. is silicon, 75–350 p.p.m. is aluminum, 25–150 p.p.m. manganese, 25–150 p.p.m. is molybdenum, 10–50 p.p.m. is titanium, 10–50 p.p.m. is copper, 10–50 p.p.m. is barium and nickel in a trace amount; said composition being further characterized as containing adenosine diphosphate, electron carriers, nitrogenase, coenzyme A and enzymes which produce hydrogenase activity, acetate kinase activity, phosphotransacetylase activity and pyruvic dehydrogenase activity; said composition prepared by mechanically shaking anaerobically dried cells of *Clostridium pasteurianum* in a buffer solution at a pH in the range of 6.3 to 6.8, at about 30° C., in the absence of oxygen, until lysis is effected, and centrifuging the resultant mass at 0°–30° C. in the continued absence of oxygen to obtain said composition as the supernatant liquid.

References Cited by the Examiner

Hughes: British Journal of Experimental Pathology, vol. 32, pp. 97–102.

Shug et al.: Journal of the American Chemical Society, 76, 3355–3356 (1954).

Westlake: A Study of Nitrogen Fixation by *Clostridium pasteurianum* (doctoral thesis, U. of Wisconsin, 1958), 115 pages (pp. 46, 47, 69, 78, 82, 84, 96 and 97 relied on), L. C. Card No. Mic. 58–7548, (abstract of this article is in Dissertation Abstracts 19, 1524–1525 (January 1959).

A. LOUIS MONACELL, *Primary Examiner.*